United States Patent
Jacobson

[15] 3,696,976
[45] Oct. 10, 1972

[54] LINEARIZED GATE CONTROL SYSTEM FOR MULTIPLE FEEDER AND HOPPER ARRANGEMENTS

[72] Inventor: Wayne B. Jacobson, Cedar Rapids, Iowa

[73] Assignee: Iowa Manufacturing Company, Cedar Rapids, Iowa

[22] Filed: June 17, 1970

[21] Appl. No.: 57,885

Related U.S. Application Data

[62] Division of Ser. No. 793,962, Jan. 27, 1969, Pat. No. 3,581,947.

[52] U.S. Cl. ................................222/504, 222/505
[51] Int. Cl. ................................................B67d 5/60
[58] Field of Search..........222/55, 56, 134, 287, 333, 222/504, 505, 506; 251/133, 229; 105/240, 287; 234/676; 198/54, 56, 57

[56] References Cited

UNITED STATES PATENTS

| | | | |
|---|---|---|---|
| 2,517,408 | 8/1950 | Olcott | 222/504 |
| 3,241,730 | 3/1966 | Doreg | 222/505 |
| 3,332,578 | 7/1967 | Linville | 222/57 |
| 3,501,030 | 3/1970 | Flink | 105/287 |

*Primary Examiner*—Samuel F. Coleman
*Assistant Examiner*—Larry Martin
*Attorney*—Haven E. Simmons and James C. Nemmers

[57] ABSTRACT

A linearized gate control for multiple hopper-feeders of the cold feed system of an asphalt plant is disclosed. Each hopper includes a cam, driven by a position servo motor, which opens or closes the gate governing the flow of aggregate from the hopper to its feeder, the latter being driven at a constant speed. The cam is profiled so that equal increments of motor shaft rotation produce equal increments of gate opening. The servo motors of all hoppers are connected into an electrical bridge circuit such that, after the respective proportionate openings of the gates are initially established by the setting of individual electrical controls for the gate motors, adjustment of a single master control to produce a certain percentage increase or decrease in the total aggregate delivered from all the hoppers will also increase or decrease the opening of each gate by the same percentage, as the case may be.

5 Claims, 5 Drawing Figures

PATENTED OCT 10 1972 3,696,976

INVENTOR.
Wayne D. Jacobson

INVENTOR
Wayne D. Jacobson

LINEARIZED GATE CONTROL SYSTEM FOR MULTIPLE FEEDER AND HOPPER ARRANGEMENTS

CROSS REFERENCE TO RELATED ART

This application is a division of application number 793,962 filed January 27, 1969 now patent number 3,581,947.

BACKGROUND OF THE INVENTION

Typically, the cold feed system in an asphalt plant consists of several hoppers containing the various sizes of aggregate which are to be joined proportionately, according to a particular specification, before being sent to the dryer. Each hopper usually includes a lower stub hopper connected thereto which opens directly through its bottom onto a horizontal feeder, generally of the belt, vibratory or reciprocating kind. The latter moves the aggregate laterally from beneath the stub hopper and deposits the same on a delivery conveyor traveling beneath all the hoppers for removal to the dryer. In order to control the amount of aggregate taken from each stub hopper by its feeder, the practice is to provide a gate transversely overlying the feeder, the height of the lower edge of the gate above the feeder governing the amount of aggregate the feeder is permitted to carry off and discharge onto the delivery conveyor.

When the asphalt plant is to produce a mix according to a given specification, current practice is to adjust the gates of the hoppers manually to provide the initial proper proportion of aggregate from each to make up the total thereof to be sent to the dryer. During operation of the plant later on, it is often necessary to increase or decrease from time to time the total amount of aggregate discharge onto the delivery conveyor while maintaining the same proportion of its constituents. Obviously, this cannot be accomplished simply by opening or closing each gate equally since, as is almost always the case, the gates are not initially opened the same amount. Instead, each gate would have to be opened or closed by the same percentage as that of the increase or decrease in the total amount of aggregate desired in order to maintain the same proportionate combination of the individual sized aggregates. For instance, if an increase of 25 percent in the total amount of aggregate is desired, and one hopper is supplying, say 10 percent and another 40 percent of the total, plainly the gate of the first must be opened a lesser distance than the gate of the second in order to increase the delivery from each 25 percent. For this reason, it is not possible simply to gang together all the gates so that they may be opened and closed equal amounts; obviously, also, it is undesirable to have to go to each gate individually and readjust it by hand each time a proportionate change in its opening is needed.

Rather than try to vary the gate openings once they are initially manually set, the practice has been instead to vary proportionately the operating speeds of the individual feeders beneath the hoppers from a remote control station in order to achieve proportionate changes in the aggregate supplied from each hopper. For this purpose, at least in the case of belt type of feeders, each feeder is driven through an infinitely variable speed device governed by an electrical circuit of the bridge type. Such devices are either D.C. motors or variable speed mechanical transmissions of the friction type. However, such mechanical transmissions are relatively exceedingly complex, costly and delicate, and suitable D.C. motors are also relatively costly. Should one such transmission fail, the entire asphalt plant must be shutdown until repair or replacement can be made inasmuch as, since the transmission is an integral part of the feeder drive, manual adjustment of its associated gate is useless because the feeder itself is paralyzed. Repair of such transmissions in the field is not feasible owing to their complexity, and field replacement is not probable owing to the unlikeliness of having spares on hand because of their costliness. In the case of vibratory feeders, the practice is to vary the feed by means of rheostats, but feeders of this nature are not too widely used because their feed is not positive enough in many instances. Reciprocating feeders are even more rarely used owing to their complexity and maintenance problems. In any event, no matter what kind of feeders have been employed, it has not been possible heretofore, so far as is known, to achieve proportionate changes in the total aggregate supply by means only of the hopper gates themselves, nor to set the openings thereof initially, without in each instance having to go to each gate individually and do so manually.

The chief object of the present invention, therefore, is to provide means by which the hopper gates themselves in the cold feed system of an asphalt plant may be adjusted, both to produce initially the desired proportion of the aggregate from each hopper as well as thereafter to achieve proportionate changes in the supply from all hoppers, from a remote control station during operation of the plant.

SUMMARY OF THE INVENTION

Essentially, the foregoing object and others are achieved in the preferred embodiment of the invention by operating each hopper gate by means of a large vertical cam plate driven by a position servo motor. The gate itself is largely conventional in design and consists of an arcuate plate facing upstream of the feeder, adjustment of the height of the lower edge of the plate above the feeder controlling the amount of aggregate each feeder is allowed to deposit on the delivery conveyor. The gate plate, again as is typical, is supported by a pair of spaced brackets attached at one end to the downstream face of the gate plate and fixed at their other ends to a horizontal shaft downstream of the gate and journaled in the stub hopper transversely of and above the feeder. A control arm, rigidly fixed to the gate shaft, extends further downstream therefrom so that vertical movement of the arm will cause corresponding movement of the gate on its shaft relative to the feeder. The control arm in turn carries a horizontally journaled cam follower which engages the edge of the cam plate, the latter being profiled, by well known methods, to provide equal increments of gate openings for equal increments of motor shaft rotation.

The position servo motors of all gates are controlled by a typical bridge circuit containing individual command potentiometers disposed at a remote control station and corresponding individual actuator potentiometers incorporated in each motor by which the opening of each gate is initially set. A master trim potentiometer at the control station is calibrated each side of its null position in percentage of increase or decrease of total aggregate desired. Once the initial openings of the individual gates are set at the remote control station by the command potentiometers, thereafter adjustment of the master potentiometer one way or the other from its null position results in increments of rotation of the servo motors of all gates proportionate to the original settings of the command potentiometers, that is, proportionate to the original gate openings. The respective cam plates driven by the servo motors, however, transform the proportionate increments of angular motor shaft rotation into linear increments of gate opening or closing proportionate to the original because equal angular increments of motor shaft rotation do not result in equal angular increments of gate shaft rotation but, owing to the cam plate profiles, in equal linear increments of gate opening. Thus the original proportion of aggregates discharged to the delivery conveyor is preserved while the total amount of aggregate is increased or decreased, as the case may be.

Accordingly, complex and costly variable speed transmissions or relatively expensive D.C. motors can be dispensed with and simple A.C. motors and reduction gear boxes substituted which are easily repairable or replaceable in the field. Furthermore, not only can proportionate changes in the total amount of aggregate be made from a remote control station, but the hopper gate openings can be initially remotely set from that same station without the need in either case of actually going to the individual gates and doing so manually. The gate control system of the present invention is relatively inexpensive and much more reliable since it is so much less complex. Should the system fail, means are also provided whereby the gates can be manually adjusted on the spot, whereupon the plant can continue to operate since the system is wholly independent of the feeders or their drives; in other words, the system "fails safe," which is an important feature. In short, the present invention provides an effective form of proportionate remote control of the cold feed of aggregate in an asphalt plant at less cost, complexity and fragility and of greater utility than has hitherto been the case.

DESCRIPTION OF THE PREFERRED EMBODIMENT

Figure 1:
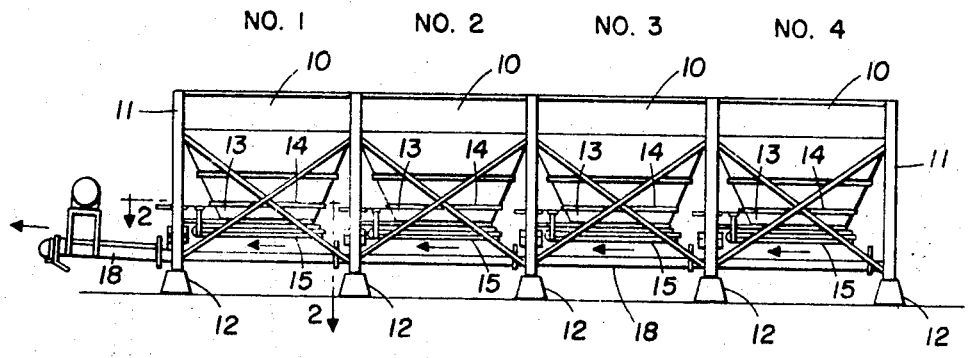
FIG. 1 is a side elevational view illustrating a typical four hopper-feeder cold feed arrangement in an asphalt plant.
Figure 2:
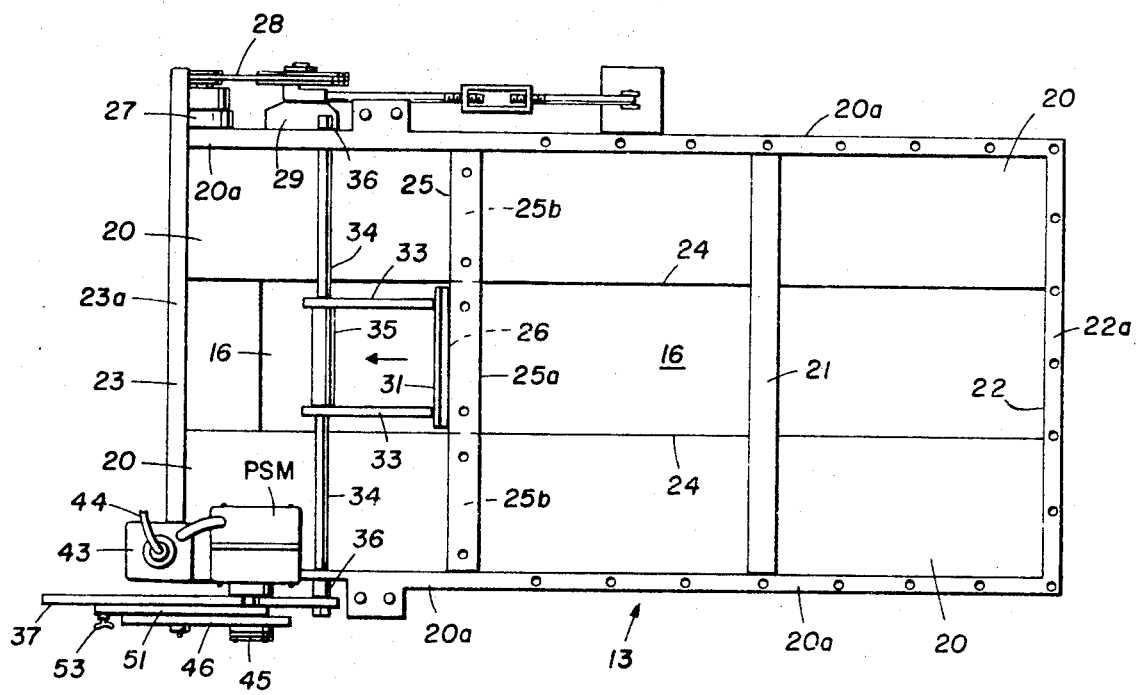
FIG. 2 is a view taken along the line 2—2 of FIG. 1 and illustrates a top plan view of one of the stub hoppers with its gate and gate actuating mechanism according to the present invention.

In FIG. 1, a row of four, generally rectangular hoppers 10, Nos. 1 – 4, of a typical cold feed system in an asphalt plant are shown supported by braced columns 11 sitting on pedestals 12. Each hopper 10 includes a lower stub hopper 13 secured to a horizontal flange 14 about the lower end of the former. Suspended beneath each stub hopper 13 is a feeder 15, those shown being of the belt type, having a belt 16 and head pulley 17 (see FIG. 3). The feeders 15 discharge onto a single delivery conveyor 18, supported by the columns 11, running beneath the feeders 15, the upper flights of the latter and of the delivery conveyor 18 all moving in the direction shown by the arrows in FIGS. 1, 2 and 3 toward the dryer and remainder of the asphalt plant (not shown). The hoppers 10, of course, contain the various sizes of aggregate called for by the specification of the particular bituminous mix to be prepared by the plant. Since the stub hoppers 13 and their associated mechanism are all identical, only one need be and is described hereafter.

Each stub hopper 13 includes a pair of elongated sloping side walls 20, reinforced by an upper transverse brace member 21, a vertical rear end wall 22 and front end wall 23, and a feeder opening 24 running centrally the length thereof between the lower edges of the side walls 20. The overall length of each stub hopper 13 is greater than that of the lower opening of its respective hopper 10 so that a transverse brace member 25, having a horizontal flange 25a along its upper edge, is provided between the upper edges of side walls 20 intermediate the brace member 21 and the front end wall 22 which, together with flanges 20a and 22a flush therewith on the upper edges of the side walls 20 and the rear end wall 22, respectively, engage the flange 14 of the hopper 10 thereabove. The flanges 20a are carried forward to the front end wall 23 which is also provided with an upper flange 23a flush therewith. The forward edge of the brace member 25 is carried down at 25b on each side of the feeder opening 24 to the side walls 20 therebelow to provide a vertical, rectangular gate opening 26 immediately below which is the upper flight of belt 16. The head pulley 17 of the latter is driven by an appropriate constant speed, A.C. motor 27 through a belt 28 and a simple reduction gear box 29, all carried by the forward end of the stub hopper 13 along one side wall 20.

Figure 3:
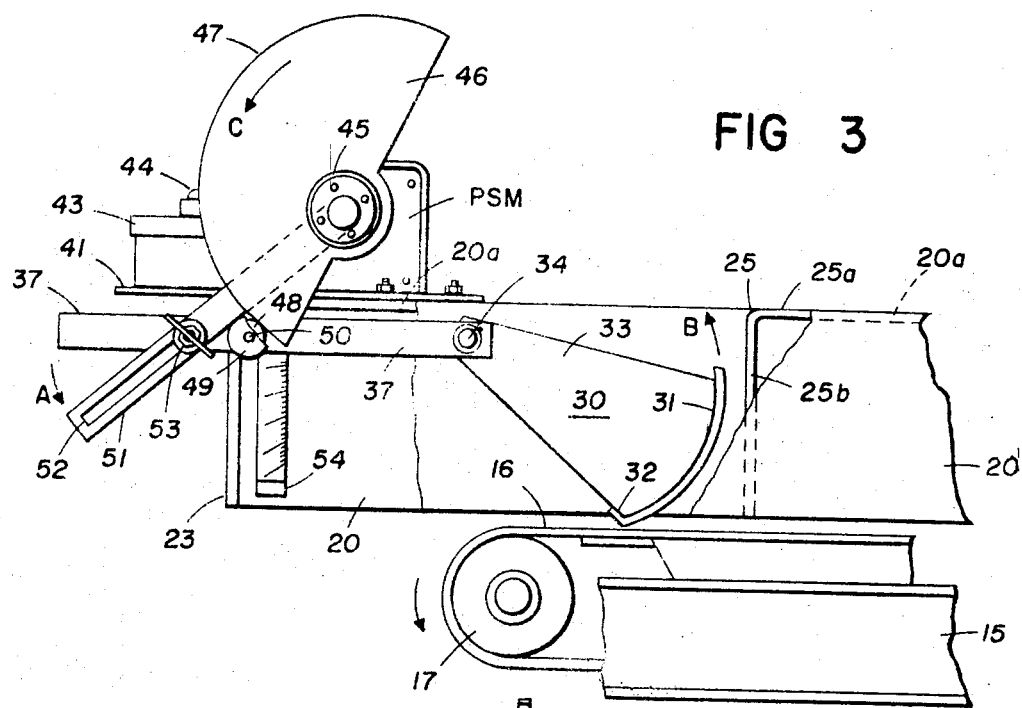
FIG. 3 is a side elevational view of the front part of the stub hopper shown in FIG. 2, and illustrating the gate actuating mechanism, certain portions being broken away for clarity.
Figure 4:
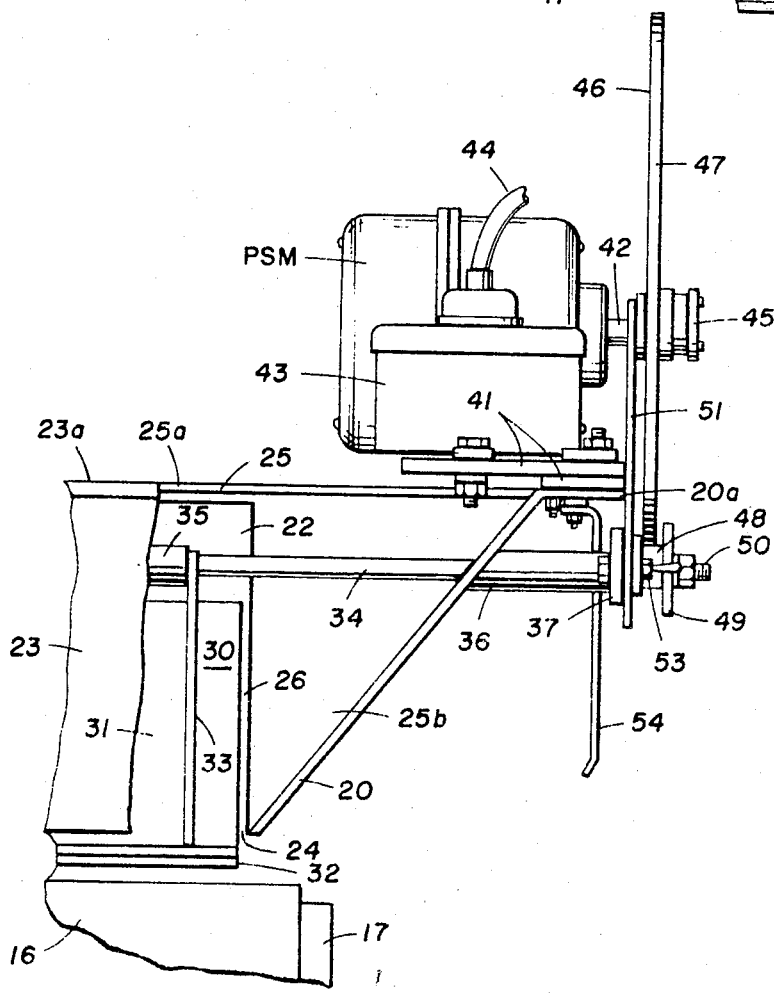
FIG. 4 is a partial end elevational view of the stub hopper in FIG. 3, certain portions being broken away for clarity.

As mentioned, the stub hopper gate, generally indicated at 30, consists simply of a transverse arcuate plate 31 spanning the gate opening 26, its convex side facing upstream of belt 16 and provided with a downstream turned lip 32 along its lower edge above belt 16. To the concave face of plate 31 are fixed the ends of a pair of spaced, sector-shaped brackets 33 which extend downstream therefrom, their other ends being apertured to receive a transverse gate shaft 34, parallel to plate 31, to which brackets 33 are fixed by a sleeve 35 therebetween. The gate shaft 34 is journaled at 36 in the upper edges of side walls 20, and the end thereof remote from the feeder motor 27 is extended outboard of the upper edge of its adjacent side wall 20 and fixed to a gate control arm 37 extending horizontally downstream therefrom beyond the front end wall 23 with respect to the lowermost position of gate 30 above the belt 16, as shown in FIG. 3. Hence, movement of the control arm 37 in the direction indicated by the arrow A in the latter Figure will result in rotation of shaft 34 and consequent movement of gate 30 in the direction indicated by the arrow B in that Figure, and vice versa.

At the forward corner of the stub hopper 13 opposite feeder motor 27 a position servo, gate control motor and gear box PSM is secured atop a platform provided by a pair of stacked plates 41 secured to the flanges 20a and 23a of the adjacent side and front end walls 20 and 23, respectively. The motor shaft 42 of PSM extends outboard beyond the adjacent flange 20a and control arm 37 parallel to gate shaft 34. The plates 41 also support an appropriate electrical connection box 43 to which an electrical conduit 44 leads from a remote control panel and power source (not shown). As an example, motor PSM may be a Model 35–183–1 position servo motor manufactured by Barber-Coleman of Rockford, Illinois, operating on 115 volts, 60 cycle, single phase A.C., and having a 180° travel in either direction. The outer end of motor shaft 42 receives a hub assembly 45 to which is fixed a vertical cam plate 46 disposed just outboard of and parallel to control arm 37. The cam plate 46 is of an approximately 180° sector configuration, its outer periphery forming a cam profile 47, to be hereafter described in more detail, which engages a cam follower 48 and keeper 49 horizontally journaled at 50 on the outboard face of control arm 37. Inboard of cam plate 46 a manual adjusting arm 51 is journaled to motor shaft 42 and extends forwardly and downwardly therefrom past and outboard of control arm 37, the latter portion of arms 51 being provided with a lost-motion slot 52 therealong, the two arms 37 and 51 being clampable to each other by means of a thumb screw and washer assembly 53 for purposes to be later described. The latter is normally in its released position and so permits the two arms 37 and 51 to move relative to each other about their respective axes of shafts 34 and 42 owing to the lost-motion slot 52. Finally, just inboard of the control arm 37, a vertical gauge 54 is secured beneath the adjacent flange 20a and is marked in inches or percentage of gate opening. Accordingly, it will be obvious that, responsive to the cam profile 47, rotation of motor shaft 42 will cause the cam follower 48 to move the control arm 37, and thus gate 30, vertically about the axis of shaft 34 in the manner heretofore mentioned.

Referring now particularly to the profile 47 of cam plate 46, it will be recalled that the object is to control the opening of all gates 30 such that increases or decreases in the total aggregate delivered by all feeders 15 to the delivery conveyor 18 result in corresponding increases or decreases in the amount of aggregate delivered by each gate 30 proportionate to the original percentage of the whole supplied by the gates 30. This in turns means, in terms of the illustrated embodiment, that the opening of a gate 30, which is defined as the distance of the lip 32 thereof above the belt 16, must increase or decrease by an amount proportionate to its original setting. For instance, if the gate 30 of No. 1 hopper is open 4" and the gate 30 of No. 2 hopper 8", and an increase of 25 percent in the total aggregate supplied by both is desired, the gate 30 of No. 1 must be opened an additional 1" while the gate 30 of No. 2 must be opened an additional 2". The servo motors PSM of all gates 30 are operated conjointly, in the manner hereafter described, such that, when an increase or decrease in the total aggregate supplied to the delivery conveyor 18 is desired, the respective motor shafts 42 rotate through angular increments proportionate to the original openings of the respective gates 30 with which they are associated. Hence, the profile 47 of each cam plate 46 must transform equal angular increments of rotation of its respective motor shaft 42 into equal linear increments of gate opening, rather than into equal increments of angular rotation about shaft 34. Since the structure of all gates 30 and their control arms 37 is identical, and the distances between the shafts 34, the lips 32 and the cam followers 48 are all equal, the cam plates 46 may themselves also be identical in size and profile.

The profile 47 of each cam plate 46 is readily generated by the science of kinematics, the kinematic theory of cam development being well know in the art. Briefly, this may be done on a drawing table by schematically laying out a gate 30, arm 37, motor shaft 42 and cam follower 48 in the gate closed position, that is to say, the position of a gate 30 when its lip 32 is in effect in contact with the belt 16. Next, a 180° sector of rotation of motor shaft 42 is divided into equal angular increments, say 18 in number, beginning from the position of cam follower 48 when in its gate closed location. The full gate opening, as defined above, is then also divided into 18 equal linear increments and the gate thereafter "raised" one of those increments. The resulting location of the cam follower 48 with respect to its original position is noted and that location "transferred" with respect to the first angular increment about shaft 42 by regarding the latter as having "rotated" by that increment, always remembering that the path of cam follower 48 is arcuate. The gate is then "raised" another increment and the procedure repeated for all 18 increments. The result will be a series of points which may then be suitably joined to produce the ultimate cam profile 47, greater accuracy being obtained if the points of contact between the profile 47, and the cam follower 48 are plotted rather than those of the center of the latter. Hence, the cam profile 47 so obtained will very closely produce equal linear increments of opening of each gate 30 for equal angular increments of rotation of its motor shaft 42.

Figure 5:
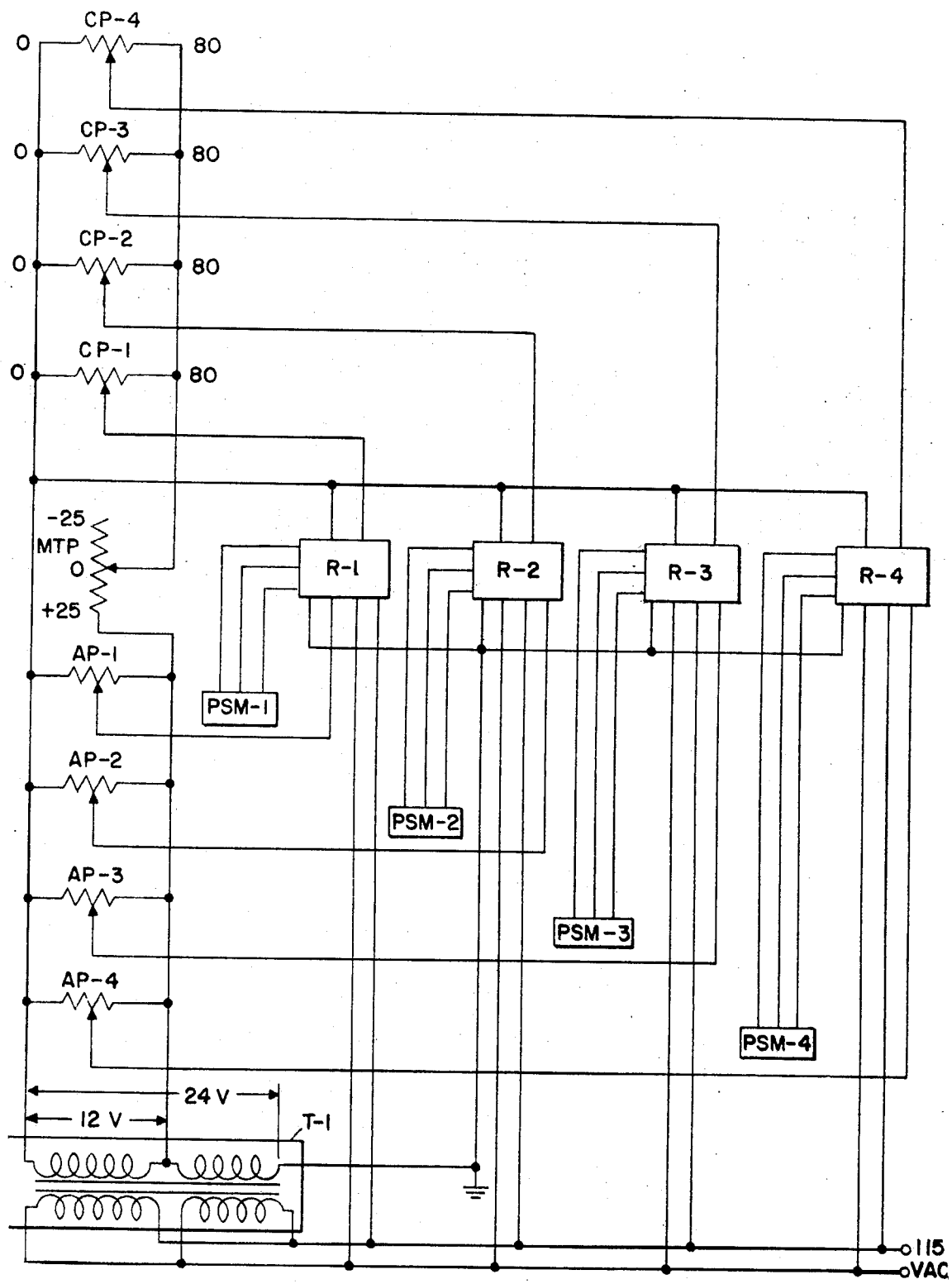
FIG. 5 schematically illustrates the electrical circuit controlling the operation of the hopper gates.

The electrical circuit by which all of the servo motors PSM are controlled is illustrated schematically in FIG. 5. It is a quite conventional bridge type circuit; indeed it is very like the circuits which are readily obtainable from various sources, used to control the infinitely variable speed mechanical transmissions employed in present cold feed systems and hence need be only briefly described. The command potentiometers, CP1-4, of their respective position servo motors PSM1-4 of hoppers Nos. 1-4 are preferably located on a panel (not shown) at the remote control station and are appropriately wired into a set of four transistor type relays, R1-4, respectively, such as those also manufactured by the aforesaid Barber-Coleman, as type AE–399, which control the supply of power to PSM1-4 from the 115 volt, A.C. source indicated, as well as their direction of rotation. The actuator potentiometers, AP1-4, are also wired into the relays R1-4 and their respective command potentiometers CP1-4; in fact, AP1-4 are incorporated in their respective motors PSM1-4 but in FIG. 5 are illustrated apart therefrom for purposes of clarity. Each command potentiometer CP1-4 is calibrated over its entire range on a scale 0 – 80, the latter figure representing 80 percent of full opening of its gate 30 with which it is associated, in order to provide for a maximum increase in gate opening of 25 percent. The master trim potentiometer, MTP, therefore, is calibrated + 25 percent and – 25 percent each side of its zero or null position, and the bridge circuit is supplied with power from the indicated 115 volt, A.C., source through a 24 volt, A.C., center tap transformer, T-1. Appropriate values for CP1-4 and AP1-4 are 100 ohms each, and for MTP, 20 ohms; other details and characteristics of the foregoing circuit will be apparent to those skilled in the art.

When the opening of each gate 30 is to be established initially, the portion of 80 percent of its opening required to supply its share of the total aggregate to be delivered to the delivery conveyor 18 is simply set on its respect one of command potentiometers, CP1-4, at the remote control panel, the master trim potentiometer, MTP, being set initially at its null position. The circuit will then cause the relays R1-4 to close, activating their respective motors PSM1-4, until the circuit is balanced, whereupon relays R1-4 will deactivate motors PSM1-4, the respective gates 30 being thus opened by the cam plates 46 the desired proportionate initial distances in the manner heretofore described. Hence, as mentioned, the need heretofore to go to each gate individually and initially set it manually is eliminated. Later on, should a variation in the total amount of aggregate be desired, movement of the master trim potentiometer, MTP, to increase or decrease the supply of total aggregate by any amount up to 25 percent will unbalance the circuit and reactivate motors PSM1-4 through relays R1-4 until rebalance occurs, during which time each motor PSM will turn through an angular increment proportionate to the initial setting of its respective command potentiometer CP1-4. The original proportions of aggregate supplied from the hoppers 10 will thus be maintained, since the cam plates 46, owing to the foregoing described characteristics of their profiles 47, result in linear changes in gate openings proportionate to the respective angular rotations of the motor shafts 42, as explained above. It should be noted that if any of command potentiometers CP1-4 is initially set at zero, no movement of master trim potentiometer MTP thereafter will result in activation of its associated motor PSM. Should any of the motors PSM1-4 or the bridge circuitry fail, then the gate or gates 30 concerned may be manually adjusted by moving the control arm 37 to the proper position indicated by the gauge 54 and locking the same in position by means of the thumb screw and washer assembly 53. Such a failure therefore does not affect the operation of the feeders 15 so that the plant can continue on without any significant downtime.

Though the present invention has been described in terms of a particular embodiment, being the best made known of carrying out the same, and detailed descriptive language has been used, it is not thereby so limited. Instead, the following claims are to be read as encompassing all adaptions and modifications of the invention falling within the spirit and scope thereof.

I claim:

1. In a stub hopper assembly for use in the cold feed system of an asphalt plant, said assembly including a bottom discharge opening and an upright gate opening at one end thereof, a gate disposed in said gate opening and raisably moveable with respect thereto to vary the size of said gate opening, and means for raising said gate including a gate shaft operatively connected to said gate and carried by said stub hopper, rotation of said shaft effecting said gate movement, the improvements in combination therewith comprising: a position servo electric motor carried by said stub hopper; cam means rotatably driven by said motor having a cam profile operatively connected to said gate shaft effective to cause said rotation thereof upon rotation of said motor, said cam profile being effective to produce equal linear increments of said gate movement upon equal angular increments of rotation of said motor.

2. The device of claim 1 wherein said cam comprises an upright, generally planar member disposed transversely of said gate shaft, a portion of the edge of said cam constituting said cam profile.

3. The device of claim 2 wherein said gate includes a control arm carried adjacent one end by said gate shaft and rotable therewith in a plane parallel to the plane of rotation of said cam, said control arm carrying a cam follower disposed thereon remote from said gate shaft and engaging said cam profile, whereby rotation of said cam effects rotation of said control arm and gate shaft.

4. The device of claim 1 wherein said hopper assembly includes a feeder therebelow having an aggregate transporting surface disposed beneath said hopper discharge opening and said gate opening effective to receive thereon aggregate from said discharge opening and to transport the same to and through said gate opening at a substantially constant rate, said gate including a lower edge portion disposed above said feeder surface, said gate movement being effective to vary the linear distance of said lower edge portion from said feeder surface and thereby the amount of aggregate carried through said gate opening by said feeder surface; and wherein said cam comprises an upright, generally planar member disposed transversely of said gate shaft, a portion of the edge of said cam constituting said cam profile.

5. The device of claim 4 wherein said gate includes a control arm fixed at one end to said gate shaft and rotable therewith in a plane parallel to the plane of rotation of said cam, said control arm carrying a cam follower rotably disposed thereon remote from said gate shaft and engaging said cam profile, whereby rotation of said cam effects rotation of said control arm and gate shaft, and wherein said gate shaft may be manually rotated by said control arm independently of said motor and cam, including means for manually locking said control arm in position.

* * * * *